(12) United States Patent
Chen et al.

(10) Patent No.: US 9,210,618 B2
(45) Date of Patent: Dec. 8, 2015

(54) UE-ASSISTED MANAGEMENT OF ADVANCED RADIO LINK FEATURES

(71) Applicant: QUALCOMM Incorporated, San Diego, CA (US)

(72) Inventors: Wanshi Chen, San Diego, CA (US); Yongbin Wei, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 13/841,004

(22) Filed: Mar. 15, 2013

(65) Prior Publication Data
US 2014/0112247 A1   Apr. 24, 2014

Related U.S. Application Data

(60) Provisional application No. 61/718,118, filed on Oct. 24, 2012.

(51) Int. Cl.
| | |
|---|---|
| *H04W 28/18* | (2009.01) |
| *H04W 8/24* | (2009.01) |
| *H04L 5/00* | (2006.01) |
| *H04W 72/04* | (2009.01) |

(52) U.S. Cl.
CPC .............. *H04W 28/18* (2013.01); *H04L 5/001* (2013.01); *H04W 8/24* (2013.01); *H04W 72/044* (2013.01)

(58) Field of Classification Search
CPC .................................................... H04W 28/18
USPC .......................................................... 370/328
See application file for complete search history.

(56) References Cited

U.S. PATENT DOCUMENTS

| | | | |
|---|---|---|---|
| 7,929,921 B2 | 4/2011 | Love et al. | |
| 2010/0273514 A1* | 10/2010 | Koo et al. | 455/501 |

(Continued)

OTHER PUBLICATIONS

3rd Generation Partnership Project;Technical Specification Group Services andSystem Aspects; AII-IP Network (AIPN) feasibility study (Release 11), 3GPP Standard; 3GPP TR 22.978, 3RD Generation Partnership Project (3GPP), Mobile Competence Centre ; 650, Route Des Lucioles ; F-06921 Sophia-Antipolis Cedex ; France, vol. SA WG1, No. V11.0.0, Sep. 21, 2012, pp. 1-63, XP050649540, [retrieved on Sep. 21, 2012] chapter 6.2.4.

(Continued)

*Primary Examiner* — Gary Mui
(74) *Attorney, Agent, or Firm* — Novak Druce Connolly Bove + Quigg LLP

(57) ABSTRACT

UE-assisted management of advanced radio link feature in a wireless communication network may include a network entity determining that a mobile entity is capable of communicating with one or more base stations using a set of radio link configurations, receiving a request from the mobile entity to restrict use of at least one of the radio link configurations, and restricting use of the at least one of the radio link configurations for communicating with the mobile entity, based on the request. The request may indicate a reason for the restriction, and the network entity may determine whether to restrict based on the reason. Once a radio link configuration is restricted, it may similarly be unrestricted based on a subsequent UE request, or based on expiration of a time period.

32 Claims, 12 Drawing Sheets

(56) References Cited

U.S. PATENT DOCUMENTS

| | | | |
|---|---|---|---|
| 2010/0291940 A1* | 11/2010 | Koo et al. | 455/450 |
| 2010/0304786 A1 | 12/2010 | Ou | |
| 2011/0244804 A1 | 10/2011 | Wu | |
| 2011/0310844 A1 | 12/2011 | Rexhepi | |
| 2012/0122458 A1 | 5/2012 | Jokinen et al. | |
| 2012/0281566 A1* | 11/2012 | Pelletier et al. | 370/252 |
| 2013/0016639 A1 | 1/2013 | Xu et al. | |
| 2013/0016696 A1* | 1/2013 | Adjakple et al. | 370/331 |
| 2013/0083783 A1* | 4/2013 | Gupta et al. | 370/338 |
| 2013/0279344 A1* | 10/2013 | Wang et al. | 370/241 |

OTHER PUBLICATIONS

Ericsson., et al., "Combined CR for CR#264 1-36 and CR#280rev1", 3GPP Draft; SP-030172, 3rd Generation Partnership Project (3GPP), Mobile Competence Centre . 650, Route Des Lucioles . F-06921 'Sophia-Anti Polis Cedex . France, TSG SA, no. Birmingham, UK; Mar. 17, 2003,' XP050199103, [retrieved on Mar. 17, 2003] chapter 5.4.6, incl. fig. 5.7.

International Search Report and Written Opinion—PCT/US2013/065796, International Search Authority—European Patent Office, Feb. 28, 2014.

Taiwan Search Report—TW102137749—TIPO—Mar. 4, 2015.

* cited by examiner

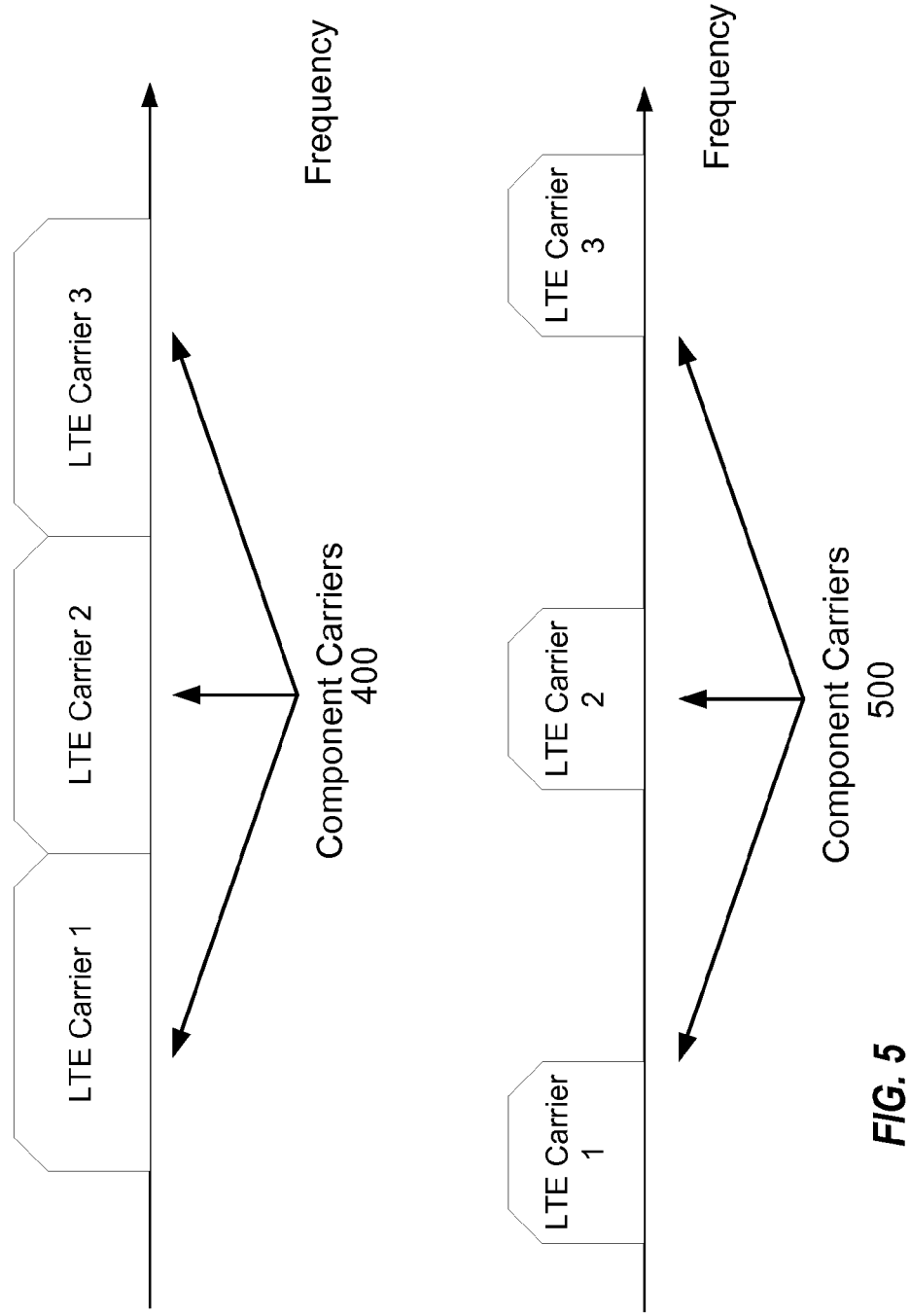

610 — DETERMINING THAT A MOBILE ENTITY IS CAPABLE OF COMMUNICATING WITH ONE OR MORE BASE STATIONS USING A SET OF RADIO LINK CONFIGURATIONS

620 — RECEIVING, AT A BASE STATION FROM A MOBILE ENTITY, A REQUEST TO RESTRICT USE OF AT LEAST ONE OF THE RADIO LINK CONFIGURATIONS

630 — RESTRICTING USE OF THE AT LEAST ONE OF THE RADIO LINK CONFIGURATIONS FOR COMMUNICATING WITH THE MOBILE ENTITY, BASED ON THE REQUEST

640 — RECEIVING A SECOND REQUEST FROM THE MOBILE ENTITY REQUESTING THAT THE AT LEAST ONE OF THE RADIO LINK CONFIGURATIONS BE UNRESTRICTED, AND THEREAFTER USING THE AT LEAST ONE OF THE RADIO LINK CONFIGURATIONS FOR COMMUNICATING WITH THE MOBILE ENTITY, BASED ON THE SECOND REQUEST

650 — DETERMINING A DURATION FOR RESTRICTING THE USE FROM THE REQUEST, AND TERMINATING THE RESTRICTING USE BASED ON THE DURATION EXPIRING

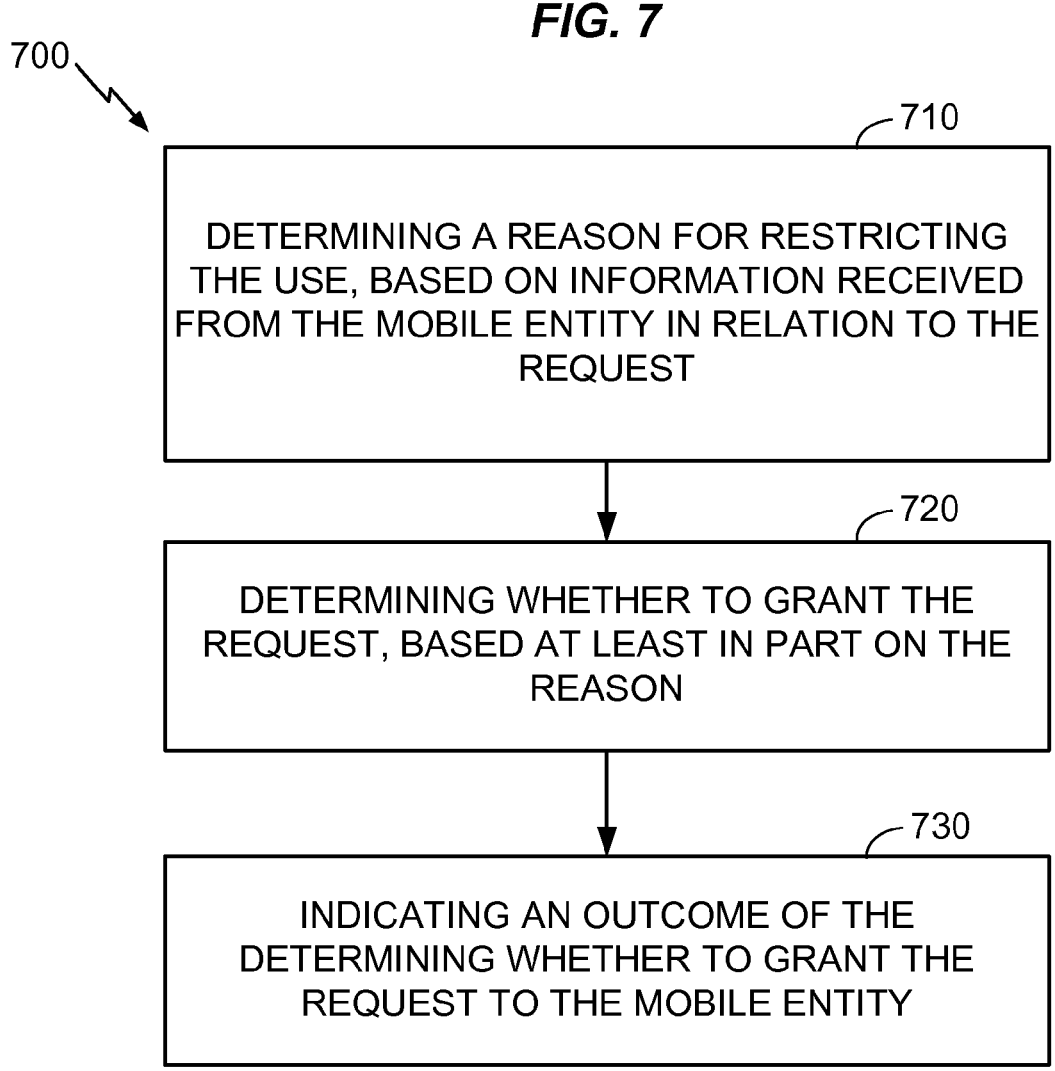

UE-ASSISTED MANAGEMENT OF ADVANCED RADIO LINK FEATURES

CROSS-REFERENCE TO RELATED APPLICATION

The present application claims priority under 35 U.S.C. §119 to provisional application Ser. No. 61/718,118 filed Oct. 24, 2012, which application is incorporated by reference herein, in its entirety.

FIELD

Aspects of the present disclosure relate generally to wireless communication systems, and more particularly to user equipment (UE) assisted management of advanced radio link features in wireless communication networks.

BACKGROUND

Wireless communication networks are widely deployed to provide various communication services such as voice, video, packet data, messaging, broadcast, or other services. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, sometimes referred to as user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs.

As demand and consumption of wireless services has increased, wireless communications systems have evolved to include advanced features in the radio link between base stations (e.g., eNBs) and subscriber stations (e.g., UEs). Advanced features may include, for example, Carrier Aggregation (CA) and Coordinated Multipoint Transmission (CoMP). A wireless network may determine whether to employ certain features, for example, CA, to communicate with a specific UE based on the reported capability of the UE. For example, the network may support advanced features for UEs that are capable (e.g., posses the required hardware, firmware, and/or software) of using the advanced features, while supporting wireless service without the advanced features for UEs that are not capable of using the advanced features.

SUMMARY

Methods, apparatus and systems for UE-assisted management of advanced radio link features in cellular wireless communication networks are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method by a network entity for wireless communication may include determining that a mobile entity is capable of communicating with one or more base stations using a set of radio link configurations. For example, a base station may receive radio link capability information from the mobile entity and/or from a network node. The method may further include receiving, at a base station from a mobile entity, a request to restrict use of at least one of the radio link configurations. The method may further include restricting use of the at least one radio link configuration for communicating with the mobile entity, based on the request.

By way of example, the radio link configurations restricted by the base station may include one or more of Carrier Aggregation (CA), Coordinated Multipoint Transmission (CoMP), a maximum number of downlink layers, a maximum number of uplink layers, a maximum number of carriers, a interference cancellation capability, a multi-cluster resource allocation capability, a parallel uplink control and data transmission capability, or a category of UE.

A UE category may refer to the presence or absence of certain attributes of the radio link pertaining to the uplink or downlink capability of UE. A category may be defined by, for example, a defined peak data rate, a maximum number of downlink (DL) layers, a maximum number of uplink (UL) layers, a maximum number of carriers in CA, or some combination of the forgoing aspects. Categories may be characterized as "higher" or "lower" based on relative resource allocation, wherein a higher category requires a resource allocation greater than a lower category. A radio link configuration restriction may include restricting the mobile entity to radio link operation in a lower category than the mobile entity would otherwise be capable of.

In another aspect, the request received by the base station from the mobile entity specifies a duration for restricting the use. In response to receiving an indication of the duration, the base station may restrict the use of the radio link configuration only until the duration expires.

In another aspect of the method, the request received by the base station from the mobile entity may indicate a reason for restricting the use of the at least one of the radio link configurations. In such case, the method may further include determining whether to grant the request, based at least in part on the reason. In addition, the method may include indicating an outcome of the determining whether to grant the request to the mobile entity.

In a further aspect of the method, the base station may receive a second request from the mobile entity requesting that the at least one of the radio link configurations be unrestricted. Based on receiving the second request, the base station may unrestrict (e.g., use) the at least one of the radio link configurations for communicating with the mobile entity.

Corresponding operations may be performed by a mobile entity or other access terminal. For example, a method by a mobile entity may include determining, at a mobile entity capable of communicating with one or more base stations using a set of radio link configurations that use of at least one of the radio link configurations should be restricted. The method by the mobile entity may further include sending, from the mobile entity to a base station, a request to restrict use of the at least one of the radio link configurations. The method by the mobile entity may further include communicating with the base station using a radio link wherein use of the at least one of the radio link configurations is restricted, based on the request. The method by the mobile entity may include additional operations corresponding to the additional operations by the base station summarized above.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such a network entity, for example a base station, eNB, picocell, femtocell or Home Node B, or in the alternative, by an access terminal, for example, a mobile entity or UE. Similarly, an article of manufacture may be provided, including a computer-readable storage medium holding encoded instructions, which when executed by a processor, cause a small cell to perform the methods and aspects of the methods as summarized above.

BRIEF DESCRIPTION OF THE DRAWINGS

FIG. 4 is a block diagram illustrating an example of a continuous carrier aggregation type.

FIG. 5 is a block diagram illustrating an example of a non-continuous carrier aggregation type.

FIGS. 6-8 are flow diagrams illustrating embodiments of a methodology for UE-assisted management of radio link features at a network entity of a wireless communications system.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA) or CDMA 2000. UTRA includes Wideband CDMA (WCDMA) and other variants of CDMA. CDMA 2000 may be described by IS-2000, IS-95 and IS-856 standards. A TDMA network may implement a radio technology such as, for example, Global System for Mobile Communications (GSM). An OFDMA network may implement a radio technology such as, for example, Evolved UTRA (E-UTRA), Ultra Mobile Broadband (UMB), IEEE 802.11 (Wi-Fi), IEEE 802.16 (WiMAX), IEEE 802.20, and Flash-OFDMA. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2". The techniques described herein may be used for the wireless networks and radio technologies mentioned above as well as other wireless networks and radio technologies. By way of example only, certain aspects of the techniques are described below for LTE, and LTE terminology is used in much of the description below.

Figure 1:
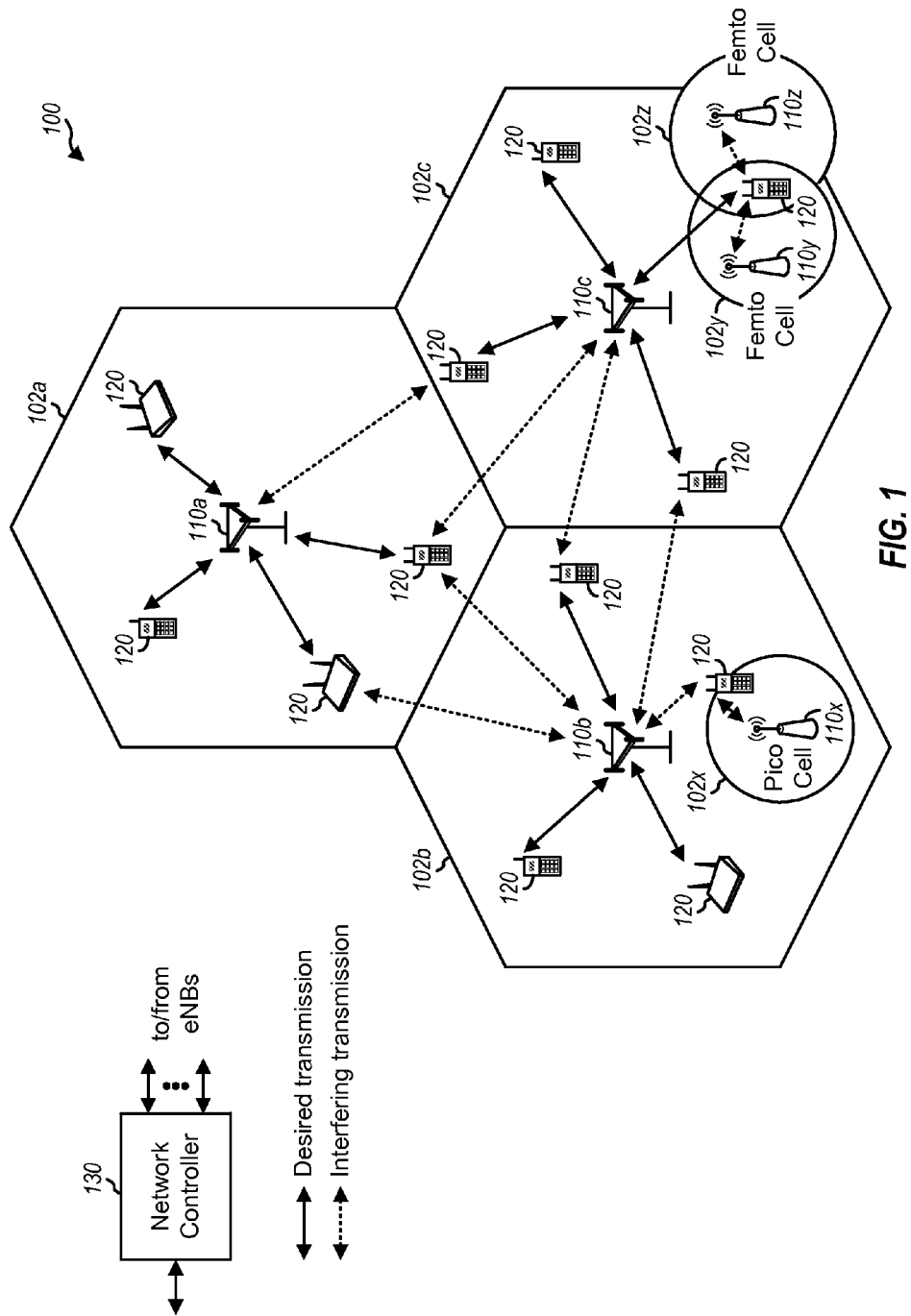
FIG. 1 is a schematic diagram conceptually illustrating an example of a wireless telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, or other group). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one cell using a single carrier, or multiple cells using corresponding multiple carriers.

The wireless network 100 may be a heterogeneous network that includes eNBs of different types, for example, macro eNBs, pico eNBs, femto eNBs, or relay stations. These different types of eNBs may have different transmit power levels, different coverage areas, and different impact on interference in the wireless network 100. For example, macro eNBs may have a high transmit power level (e.g., 5 to 40 Watts) whereas pico eNBs, femto eNBs and relays may have a lower transmit power level (e.g., 0.1 to 2 Watt). A UE may be within the coverage of multiple eNBs. One of these eNBs may be selected to serve the UE. The serving eNB may be selected based on various criteria such as, for example, received power, path loss, signal-to-noise ratio (SNR), or other criterion.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a mobile entity, a subscriber station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relay stations, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or other terminology. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively. LTE may make use of defined radio link features, such as frame, subframes, and channels that are defined by published standards for LTE. For example, various signals and channels in LTE are described in 3GPP TS 36.211, entitled "Evolved Universal Terrestrial Radio Access (E-UTRA); Physical Channels and Modulation," which is publicly available.

Figure 2:
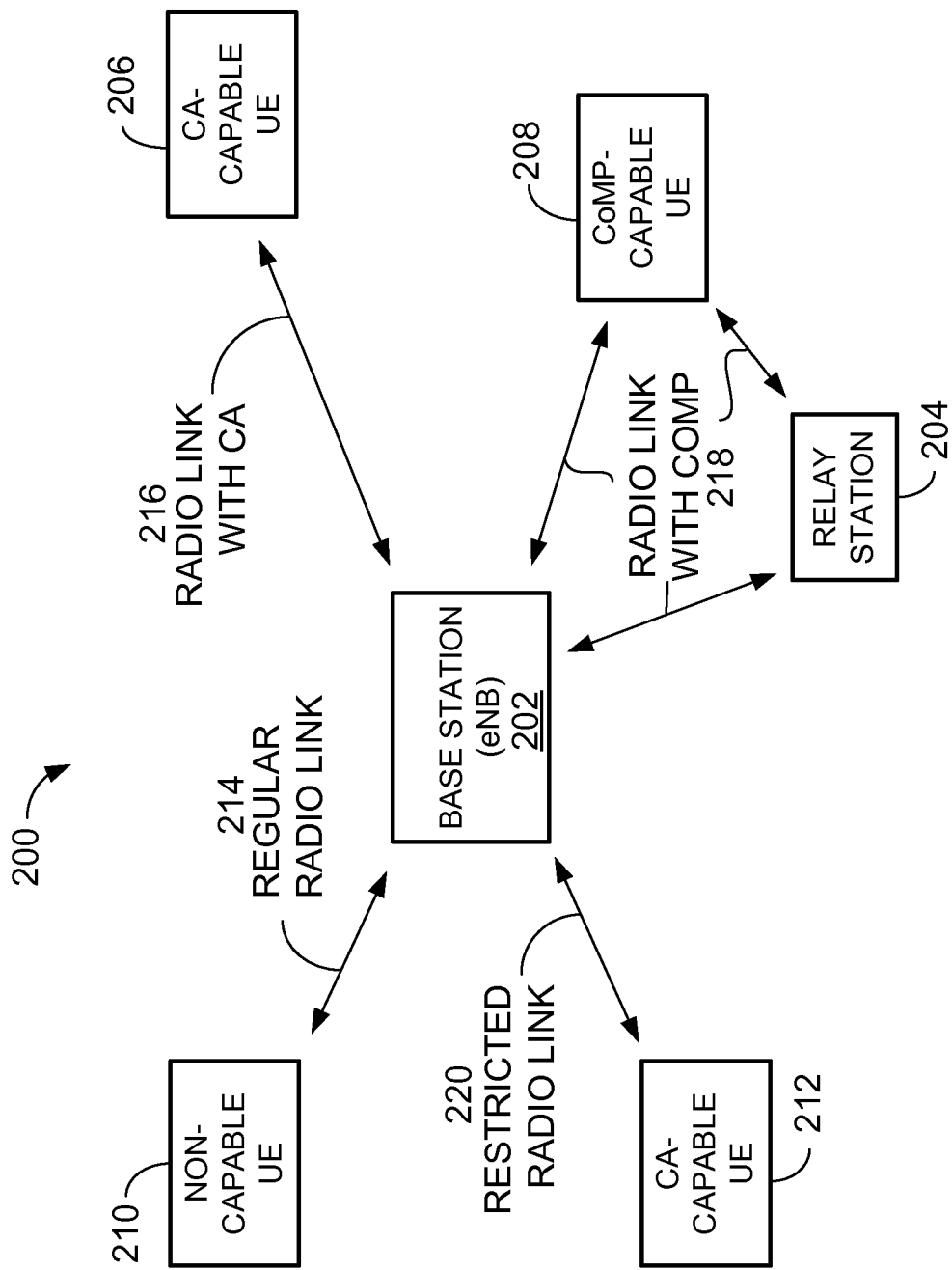
FIG. 2 is a block diagram conceptually illustrating an example of cell with restricted and unrestricted radio links in a wireless communications system.

FIG. 2 shows a system 200 including multiple UEs of different capabilities in communication with an eNB 202 using different radio links. LTE or other wireless technologies may include more than one method of configuring a radio link between a base station and a UE. Such methods may be referred to as advanced features of LTE or other radio access technology, as being optional for radio links under the applicable radio access technology. Therefore, a base station should be equipped to configure radio links with or without advanced features. The advanced features may pertain to a particular radio access technology (RAT), and may exclude features related to multiple RATs or inter-RAT implementations. In other, separate embodiments, the advanced features may include features for multiple RAT or inter-RAT implementation.

Some UEs may not be capable of communicating using the advanced features, for example a non-capable UE 210 communicating over a regular radio link 214, i.e., a radio link that does not use advanced features. Advanced features of LTE may include, for example, carrier aggregation wherein a UE, for example CA-capable UE 206, supports aggregating two or more carriers in a radio link 216. For further example, advanced features may include Coordinated Multipoint Transmission (CoMP), wherein a CoMP-capable UE 208 may be assisted in using a radio link 218 by two or more cells for example by the base station 202 and another base station 204. The base stations 202, 204 may be geographically separated from one another. An X2 interface may connect the base stations 202, 204 to each other. The base stations 202, 204 may be involved in CoMP transmission/reception with the UE 208 over the radio link 218. Other optional capabilities of radio links may include, for example, a interference cancellation capability, a multi-cluster resource allocation capability, or a parallel uplink control and data transmission capability.

Aspects of CA, CoMP and other radio link technologies may be used to define different radio link configurations, herein referred to as "UE categories." A UE category may be defined by one or more attributes of the radio link (e.g., uplink and downlink capability of UE), for example, a defined peak data rate, a maximum number of downlink (DL) layers, a maximum number of uplink (UL) layers, a maximum number of carriers in CA, or some combination of the forgoing aspects. Categories may be characterized as "higher" or "lower" based on relative resource allocation. For example, a two-carrier CA radio link may be described as in a category lower than a four-carrier CA radio link and higher than a single-carrier link.

While advanced features are generally beneficial for the end user, in some circumstances a UE that is capable of using an advanced feature may, for a temporary period, may request to not be served with one or more of the advanced features. For example, when encountering power-limited conditions, a UE may desire not to be served using a CA link to conserve power. A UE in carrier aggregation may be required to monitor two or more carriers for data demodulation, channel information feedback, or other signals, which consumes more processing power than handling a single carrier. Similarly, a UE capable of using CoMP for a radio link may desire not to be placed in CoMP operation for at least a temporary period. Other examples of radio link features that it may be beneficial for a UE to control for power conservation or other reasons may include scheduling a higher-category UE with a restricted rank for downlink (DL) MIMO, uplink (UL) MIMO, or both; multi-cluster uplink resource allocation; or interference cancellation. Reasons for a UE to indicate a restricted feature set of a radio link may include, for example, battery power status running low, current power source status (e.g., plugged or unplugged), end-user preferences, or competing processing demands consuming too much computing resources.

In some designs, an eNB may broadcast an indication whether or not the eNB supports feature restriction. In other designs, a UE may determine whether or not the eNB supports feature restriction. Accordingly, a UE 212 may indicate to the eNB 202 that, although the UE 212 is capable of or supports one or more radio link features, the UE requests that the radio link 220 to the eNB be restricted from using one or more designated features. For example, the UE may indicate that CA should be restricted until further notice, until expiration of a period of time, or until some defined future event such as the UE reconnection to the network. The indication may be provided in the form of a list identifying "unwanted" features, that is, features that the UE is requesting to be restricted. Optionally, the UE may also provide, in connection with a request to restrict a feature, a reason for making the request such as, for example, power constraints, processing constraints, or user input.

In response to receiving a request from the UE 212, the eNB 202 may automatically act based on the UE's indication, for example by granting the request and serving the radio link 212 in a restricted state. In the alternative, or in addition, the eNB 202 may determine whether or not to grant the request for a restricted radio link, based on one or more system criteria. The eNB 202 may indicate the outcome of its determination to the UE 212, or may refrain from indicating the outcome. If the eNB determines it will grant the UE restriction request, the eNB will not serve or schedule the UE using the restricted feature or features for a period of time or until further notice. If the eNB nonetheless mistakenly serves the restricted feature or feature to the UE, the UE may reject the service with the undesired feature. On the other hand, if the eNB determines it will not grant the UE restriction request, the eNB will serve the capable UE using the requested restricted feature or features. If the eNB rejects the request, the UE may send additional requests, subject to limitations to avoid causing system inefficiencies by generating repeated requests at an inefficiently high rate. In addition, the UE 212 may send an indication of its reason for the request to the base station 202, and the base station may include the indication in a re-determination of whether or not to grant the request.

The UE 212 request to restrict the radio link 220 may be indicated using Radio Resource Control (RRC) signaling or a Media Access Control (MAC) data element. Frequent signaling during a particular connection may not normally be necessary. The UE may send the request autonomously in response to detecting a UE status or user input, or may be event-triggered, for example in response to when the UE is configured, enabled or scheduled. In case of a handover to an adjacent cell, the source eNB 202 may provide an indication of the restricted features for the radio link 220 to the target eNB. The duration of the restriction may be indefinite or definite. An indefinite-duration restriction may persist until the UE requests that the restriction be removed. A definite-duration restriction may be defined to last for a specified duration, for example, to permit the UE to periodically commit client resources to a different function for a definite period of time.

Figure 3:
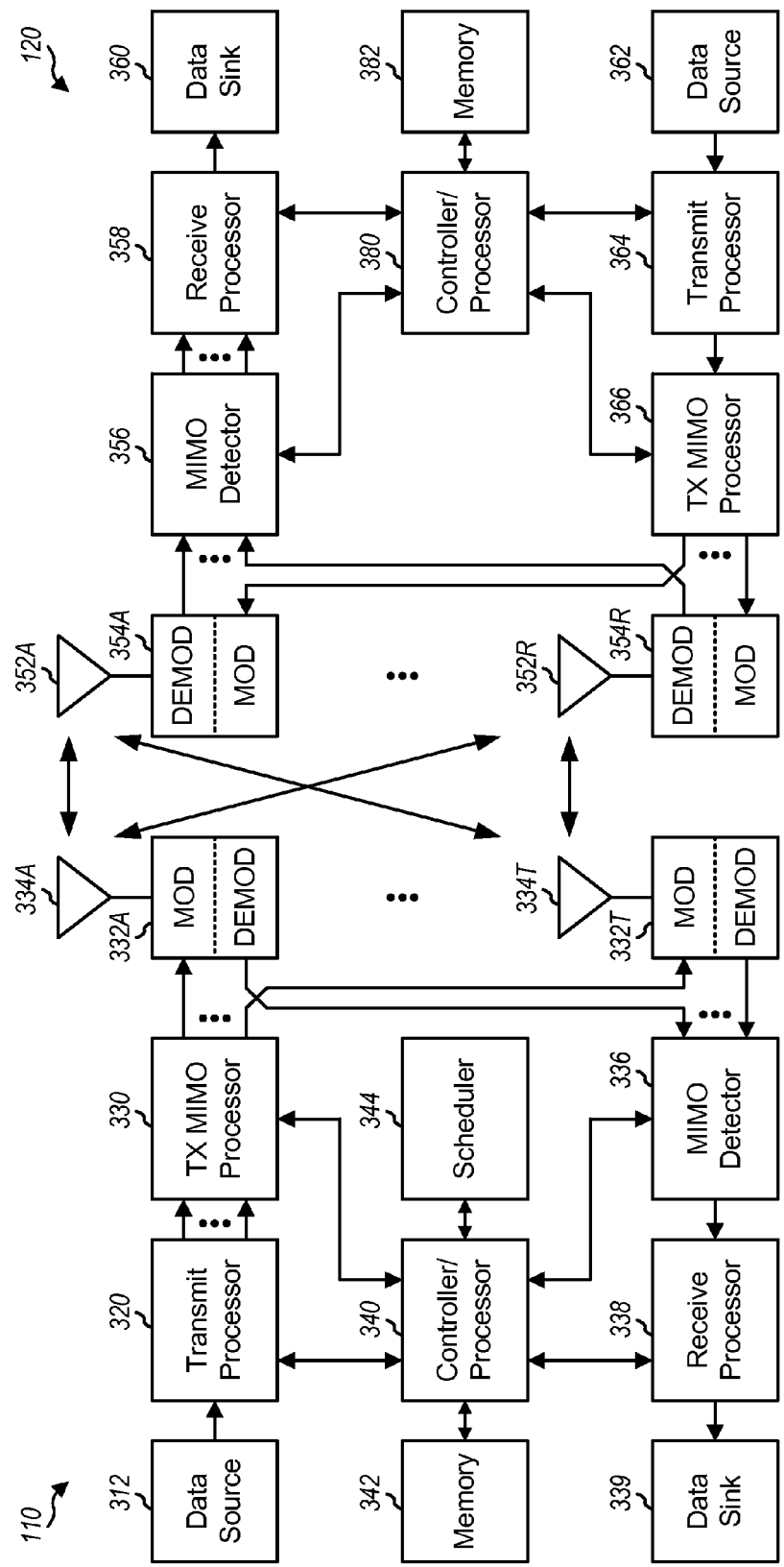
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1 or 2. The base station 110 may be equipped with antennas 334A through 334T, and the UE 120 may be equipped with antennas 352A through 352R.

At the base station 110, a transmit processor 320 may receive data from a data source 312 and control information from a controller/processor 340. The processor 320 may process (e.g., encode and symbol map) the data and control information to obtain data symbols and control symbols, respectively. The processor 320 may also generate reference symbols and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332A through 332T. Each modulator 332 may process a respective output symbol stream (e.g., for OFDM or other method) to obtain an output sample stream. Each modulator 332 may further process (e.g., convert to analog, amplify, filter, and upconvert) the output sample stream to obtain a downlink signal. Downlink signals from modulators 332A through 332T may be transmitted via the antennas 334A through 334T, respectively.

At the UE 120, the antennas 352A through 352R may receive the downlink signals from the base station 110 and may provide received signals to the demodulators (DEMODs) 354A through 354R, respectively. Each demodulator 354 may condition (e.g., filter, amplify, downconvert, and digitize) a respective received signal to obtain input samples. Each demodulator 354 may further process the input samples (e.g., for OFDM or other method) to obtain received symbols. A MIMO detector 356 may obtain received symbols from all the demodulators 354A through 354R, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354A through 354R (e.g., for SC-FDM or other method), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein, for example as described in connection with FIGS. 6-8. The processor 380 and/or other processors and modules at the UE 120 may also perform or direct the execution of the functional blocks illustrated in FIGS. 10-12, and/or other processes for the techniques described herein. The memories 342 and 382 may store data and program codes for the base station 110 and the UE 120, respectively. A scheduler 344 may schedule UEs for data transmission on the downlink and/or uplink.

In an aspect, the base station 110 for wireless communication includes means for determining that a mobile entity is capable of communicating with one or more base stations using a set of radio link configurations, coupled to means for receiving, from a mobile entity, a request to restrict use of at least one of the radio link configurations. The base station 110 may further include means for receiving, from a mobile entity, a request to restrict use of at least one of the radio link configurations. In one aspect, the aforementioned means may include the processor(s), the controller/processor 340, the memory 342, the transmit processor 320, the TX MIMO processor 330, the modulators 332A, and the antennas 334A configured to perform the functions recited by the aforementioned means. In another aspect, the aforementioned means may be a module or any apparatus configured to perform the functions recited by the aforementioned means.

In another aspect, a UE 120 capable of communicating with one or more base stations using a set of radio link configurations for wireless communication includes means for determining that use of at least one of the radio link configurations should be restricted, coupled to means for sending, to a base station, a request to restrict use of the at least one of the radio link configurations. The UE 120 may further include means for communicating with the base station using a radio link wherein use of the at least one of the radio link configurations is restricted, based on the request. In one aspect, the aforementioned means may include the processor(s), the controller/processor 380, the memory 382, the receive processor 358, the MIMO detector 356, the demodulators 354A, and the antennas 352A configured to perform the functions recited by the aforementioned means. In another aspect, the aforementioned means may be a module or any apparatus configured to perform the functions recited by the aforementioned means.

By way of example of an advanced radio link feature in LTE, LTE-Advanced UEs can use spectrum in 20 Mhz bandwidths allocated to component carriers used in carrier aggregation, for up to a total of 100 Mhz (using 5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

For the LTE-Advanced mobile systems, two types of carrier aggregation (CA) have been proposed, continuous CA and non-continuous CA. They are illustrated in FIGS. 4 and 5. Non-continuous CA occurs when multiple available component carriers 500 are separated along the frequency band, as illustrated by FIG. 5. On the other hand, continuous CA occurs when multiple available component carriers 400 are adjacent to each other, as illustrated by FIG. 4. Both non-continuous CA and continuous CA may be used to aggregate multiple LTE/component carriers to serve a single unit of LTE Advanced UE. Multiple radio frequency receiving units and multiple fast Fourier transforms (FFTs) may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary considerably at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different. Both continuous and non-continuous CA may require increased processing and power resources at the UE. Therefore, the UE may, when it detects a reason to restrict use of CA, limit the number of carriers used to some number less than the total number of available carriers. For example, the UE may request that the link be restricted to a single carrier.

In view of exemplary systems shown and described herein, methodologies that may be implemented in accordance with the disclosed subject matter, will be better appreciated with reference to various flow charts. For purposes of simplicity of explanation, methodologies are shown and described as a series of acts/blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

FIG. 6 shows a method 600 for UE-assisted management of radio link features at a network entity of a wireless communications system. The network entity may be an eNB, or other base station (e.g., femto node or other small cell) of a wireless communications network. The method 600 may include, at 610, determining that a mobile entity is capable of communicating with one or more base stations using a set of radio link configurations. The set of radio link configurations may include advanced features of LTE or similar radio access technology, as discussed in more detail elsewhere herein. The radio link configurations may pertain to a link using a particular radio access technology, and may exclude features for implementing multiple RAT capabilities at the mobile entity.

The method 600 may further include, at 620, receiving, at a base station from a mobile entity, a request to restrict use of at least one of the radio link configurations. The request may be received, for example, in an RRC signal or MAC element or a physical control channel, and may include an indication (e.g., a list) or one or more restrictions to be applied to the radio link.

The method 600 may further include, at 630, restricting use of the at least one of the radio link configurations for communicating with the mobile entity, based on the request. For example, the base station may automatically grant the request and then configure a radio link with the requesting mobile entity in accordance with the requested restriction. In the alternative, the base station may determine whether or not to grant the request based on system parameters, and configure the link with the requested restriction only if the determination is positive. Restricting may include at least partially disabling or preventing use of a radio link configuration or associated features.

The elements 640 and 650 are optional alternatives for controlling the duration of the restriction on the radio link. The method 600 is not limited to the depicted alternatives, and may be performed without including either alternative 640 or 650. In one alternative, the method 600 may include, at 640, receiving a second request from the mobile entity requesting that the at least one of the radio link configurations be unrestricted, and thereafter using the at least one of the radio link configurations for communicating with the mobile entity, based on the second request. The operation 640 may be performed to provide an indefinite duration for a radio link restriction, until a UE requests that the restriction be removed. In another alternative, the method may include, at 650, determining a duration for restricting the use from the request, and terminating the restricting use based on the duration expiring. The operation 650 may be performed to support a definite duration for the restriction, for example to facilitate allocation of UE resources to a task for a definite period.

Figure 8:
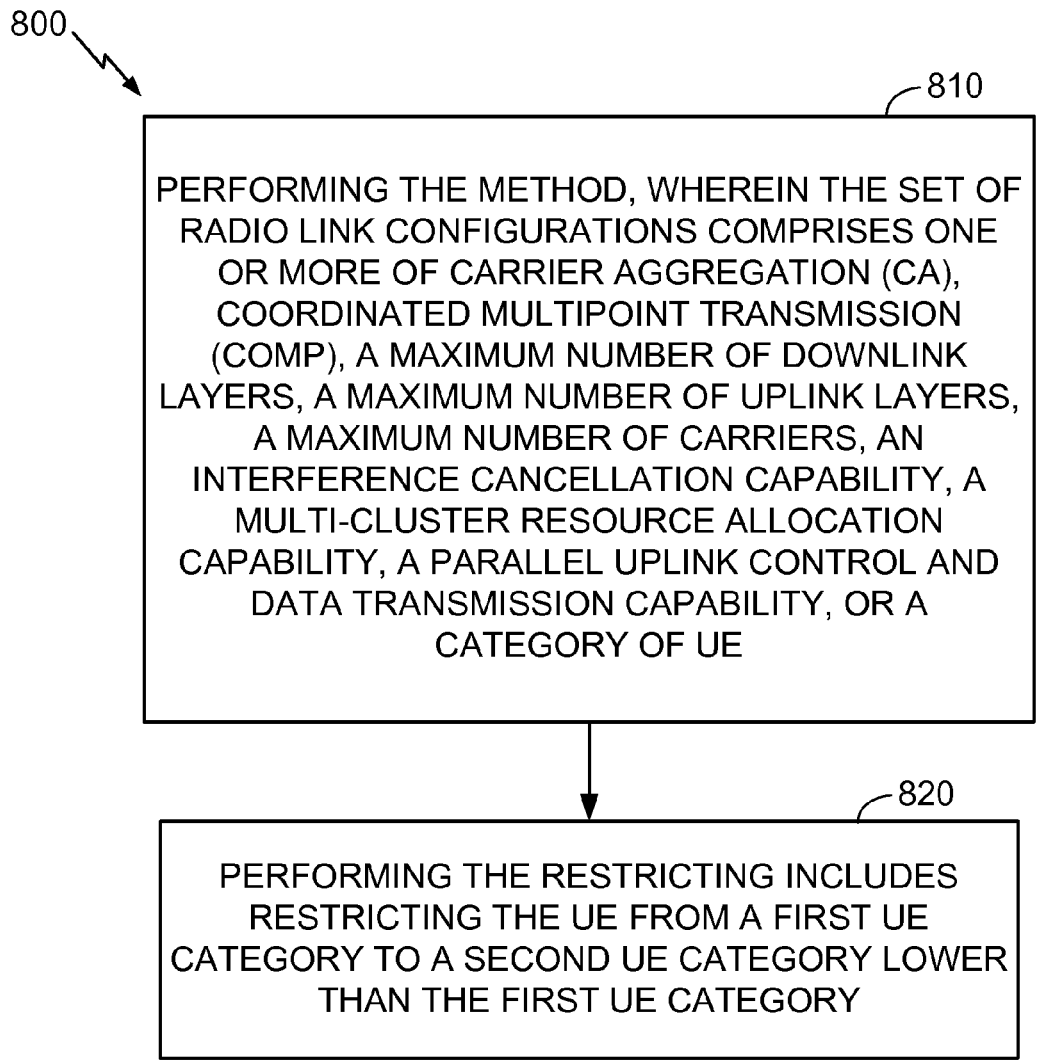

FIGS. 7-8 show further optional operations or aspects 700, 800 that may be performed by the base station in conjunction with the method 600 for UE-assisted management of radio link features at a network entity of a wireless communications system. The operations shown in FIGS. 7-8 are not required to perform the method 600. Operations 700 and 800 are independently performed and generally not mutually exclusive unless positioned on opposing branches from a block. Any one of such independent and not mutually exclusive operations may be performed regardless of whether another downstream or upstream operation is performed. If the method 600 includes at least one operation of FIGS. 7-8, then the method 600 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Referring to FIG. 7, the method 600 may include one or more of the additional operations 700. For example, the method 600 may further include, at 710, the base station determining a reason for restricting the use of the radio link, based on information received from the mobile entity in relation to the request. For example, the base station may receive an RRC or MAC information element or a physical control channel including the restriction request, and further process the information to identify an indication of one or more reasons for the request. Examples of reasons to request a restriction may include, for example, power conservation, processing power conservation (for competing processes or to conserve power), or user preference. The method 600 may further include, at 720, determining whether to grant the request, based at least in part on the reason. For example, depending on system or cell status, the base station may grant the request for power conservation but not for other reasons. The method 600 may further include, at 730, indicating an outcome of the determining whether to grant the request to the mobile entity. The mobile entity may then respond to the determination appropriately, for example preparing to continue to use or to restrict use of the advanced features in the radio link. In the alternative, the base station may not provide any indication of the outcome to the mobile entity.

Referring to FIG. 8, an aspect of the method 600 may include, at 810, the set of radio link configurations including one or more of Carrier Aggregation (CA), Coordinated Multipoint Transmission (CoMP), a maximum number of downlink layers, a maximum number of uplink layers, a maximum number of carriers, an interference cancellation capability, a multi-cluster resource allocation capability, a parallel uplink control and data transmission capability, or a category of UE. The set of radio link configurations may include advanced LTE features and/or more detailed parameters of the advanced features or of non-advanced (regular) features.

In another aspect of the method 600, at 820, performing the restricting includes, optionally, restricting the UE from a first UE category to a second UE category lower than the first UE category. A UE category may be defined by one or more attributes of the radio link, for example, a defined peak data rate, a maximum number of downlink layers, a maximum number of uplink carriers, a maximum number of carriers in CA, or some combination of the forgoing aspects. Categories may be characterized as "higher" or "lower" based on relative resource use.

Figure 9:
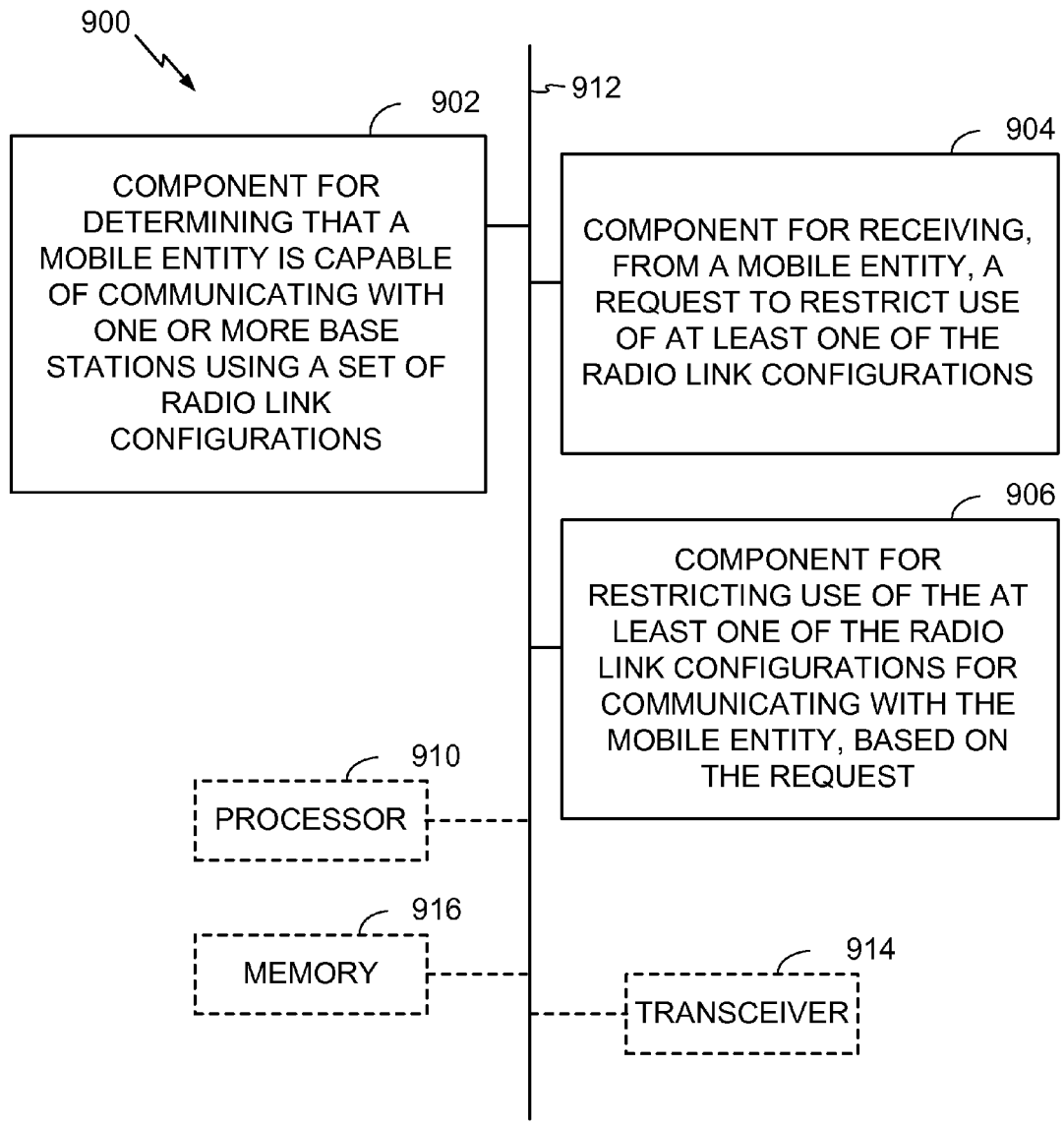
FIG. 9 is a block diagram illustrating an embodiment of an apparatus for UE-assisted management of radio link features, in accordance with the methodologies of FIGS. 6-8.

With reference to FIG. 9, there is provided an exemplary apparatus 900 that may be configured as a base station in a wireless network, or as a processor or similar device for use within the base station, for UE-assisted management of radio link features at a network entity of a wireless communications system. The apparatus 900 may include functional blocks that can represent functions implemented by a processor, software, or combination thereof (e.g., firmware).

As illustrated, in one embodiment, the apparatus 900 may include an electrical component, module or means 902 for determining that a mobile entity is capable of communicating with one or more base stations using a set of radio link configurations. For example, the electrical component or means 902 may include at least one control processor 910 coupled to a transceiver 914 or the like and to a memory 916 with instructions for determining a capability of the mobile entity. The control processor 910 may operate an algorithm, which may be held as program instructions in the memory component 916. The algorithm may include, for example, receiving a signal from a mobile entity, and processing the signal to discover a capability of the mobile entity to use one or more of CA, CoMP, a maximum number of downlink layers, a maximum number of uplink layers, a maximum number of carriers, an interference cancellation capability, a multi-cluster resource allocation capability, a parallel uplink control and data transmission capability, or a category of UE, according to a predetermined communications protocol.

The apparatus 900 may include an electrical component or means 904 for receiving, from a mobile entity, a request to restrict use of at least one of the radio link configurations. For example, the electrical component or means 904 may include at least one control processor 910 coupled to a transceiver 914 or the like and to a memory 916 holding instructions for receiving a signal from a mobile entity indicating a request to restrict a specified feature. The control processor 910 may operate an algorithm, which may be held as program instructions in the memory component 916. The algorithm may include, for example, receiving a signal from a mobile entity, and processing the signal to identify a request from the mobile entity indicating a specific restriction of the radio link configuration.

The apparatus 900 may include an electrical component or means 906 for restricting use of the at least one of the radio link configurations for communicating with the mobile entity, based on the request. For example, the electrical component or means 906 may include at least one control processor 910 coupled to a transceiver 914 or the like and to a memory 916 holding instructions for configuring a radio link with a mobile entity with one or more advanced features restricted. The control processor 910 may operate an algorithm, which may be held as program instructions in the memory component 916. The algorithm may include, for example, configuring a radio link with the mobile entity wherein one or more of CA, CoMP, a maximum number of downlink layers, a maximum number of uplink layers, a maximum number of carriers, an interference cancellation capability, a multi-cluster resource allocation capability, a parallel uplink control and data transmission capability is restricted (e.g., at least partially disabled or not used), or a category of UE is restricted to a lower level. The apparatus 900 may include similar electrical components for performing any or all of the additional operations 700 or 800 described in connection with FIGS. 7-8, which for illustrative simplicity are not shown in FIG. 9.

In related aspects, the apparatus 900 may optionally include a processor component 910 having at least one processor, in the case of the apparatus 900 configured as a network entity. The processor 910, in such case, may be in operative communication with the components 902-906 or similar components via a bus 912 or similar communication coupling. The processor 910 may effect initiation and scheduling of the processes or functions performed by electrical components 902-906. The processor 910 may encompass the components 902-906, in whole or in part. In the alternative, the processor 910 may be separate from the components 902-906, which may include one or more separate processors.

In further related aspects, the apparatus 900 may include a radio transceiver component 914. A stand alone receiver and/or stand alone transmitter may be used in lieu of or in conjunction with the transceiver 914. In the alternative, or in addition, the apparatus 900 may include multiple transceivers or transmitter/receiver pairs, which may be used to transmit and receive on different carriers. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for performing the activity of the components 902-906, and subcomponents thereof, or the processor 910, the additional aspects 700 or 800, or the methods disclosed herein. The memory component 916 may retain instructions for executing functions associated with the components 902-906. While shown as being external to the memory 916, it is to be understood that the components 902-906 can exist within the memory 916.

Figure 10:
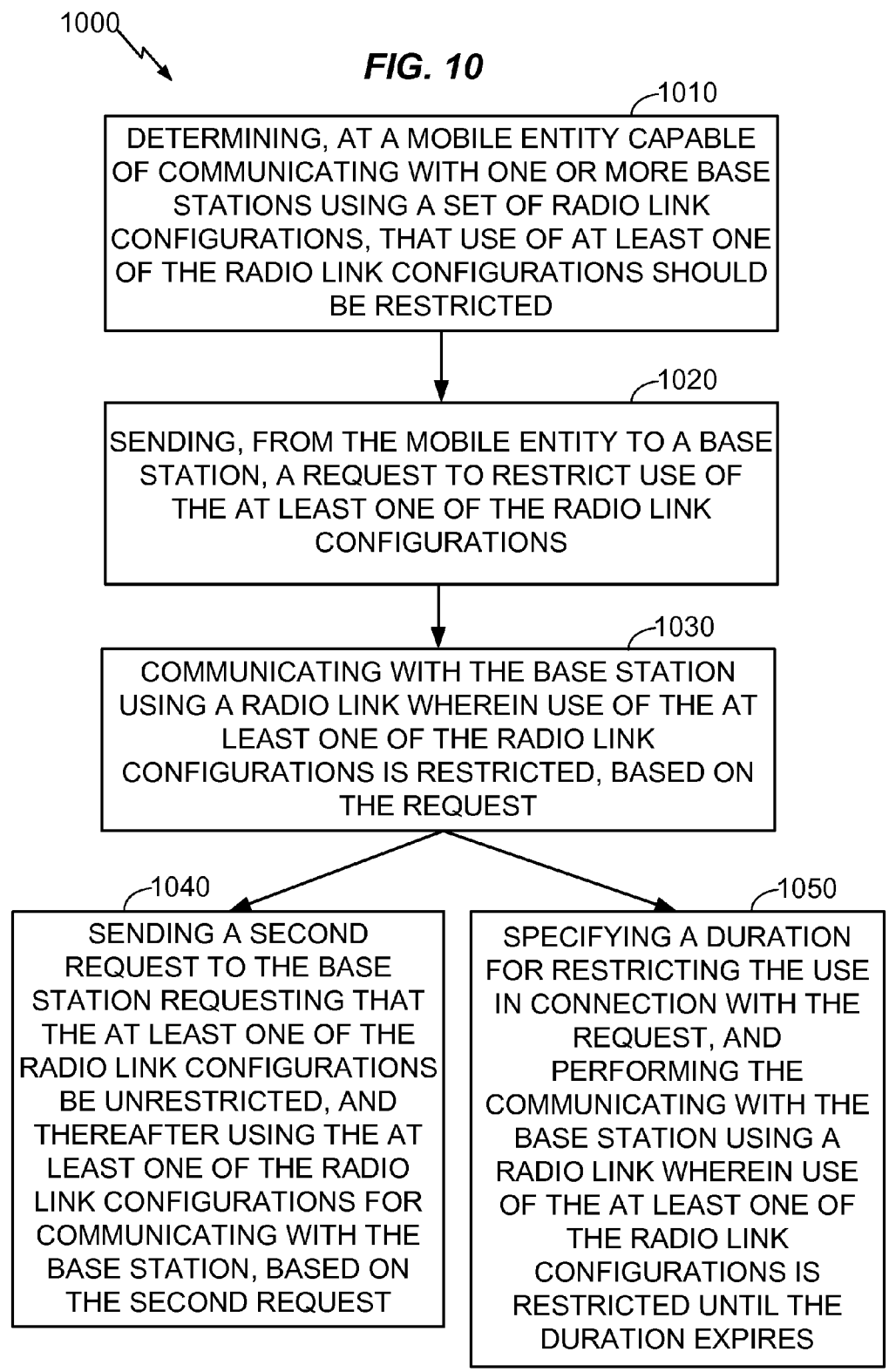
FIGS. 10-12 are flow diagrams illustrating embodiments of a methodology for UE-assisted management of radio link features at a mobile entity of a wireless communications system.

A mobile entity in communication with a base station performing the method 600 may perform a method 1000 for UE-assisted management of radio link features at a mobile entity of a wireless communications system, as shown in FIG. 10. The mobile entity may comprise an entity of any of the various forms described herein, for example, a UE. The method 1000 may include, at 1010, determining, at a mobile entity capable of communicating with one or more base stations using a set of radio link configurations, that use of at least one of the radio link configurations should be restricted (e.g., at least partially disabled or not used). The determining may be based, for example, on the status of a power resource or processing resource, or in response to a user preference received via user input.

The method 1000 may further include, at 1020, sending, from the mobile entity to a base station, a request to restrict use of the at least one of the radio link configurations. The method 1000 may further include, at 1030, communicating with the base station using a radio link wherein use of the at least one of the radio link configurations is restricted, based on the request.

The elements 1040 and 10650 are optional alternatives for controlling the duration of the restriction on the radio link. The method 1000 is not limited to the depicted alternatives, and may be performed without including either alternative 1040 or 1050. In one alternative, the method 1000 may include, at 1040, sending a second request to the base station requesting that the at least one of the radio link configurations be unrestricted, and thereafter using the at least one of the radio link configurations for communicating with the base station, based on the second request. The operation 1040 may be performed to request an indefinite duration for a radio link restriction, until a UE requests that the restriction be removed. In another alternative, the method may include, at 650, specifying a duration for restricting the use in connection with the request, and performing the communicating with the base station using a radio link wherein use of the at least one of the radio link configurations is restricted until the duration expires. The operation 650 may be performed to support a definite duration for the restriction, for example to facilitate allocation of UE resources to a task for a definite period. Alternatively, the restriction can be subframe dependent. That is, in a first set of subframes, the restriction may be applied, while in a second set of subframes, no restriction is applied. The first set subframes and the second subframes may be interleaved. As an example, restriction may be applied to odd-numbered subframes (e.g., 1, 3, 5, . . . ), and may be lifted to even-numbered subframes (e.g., 2, 4, 6, . . . ).

Figure 11:
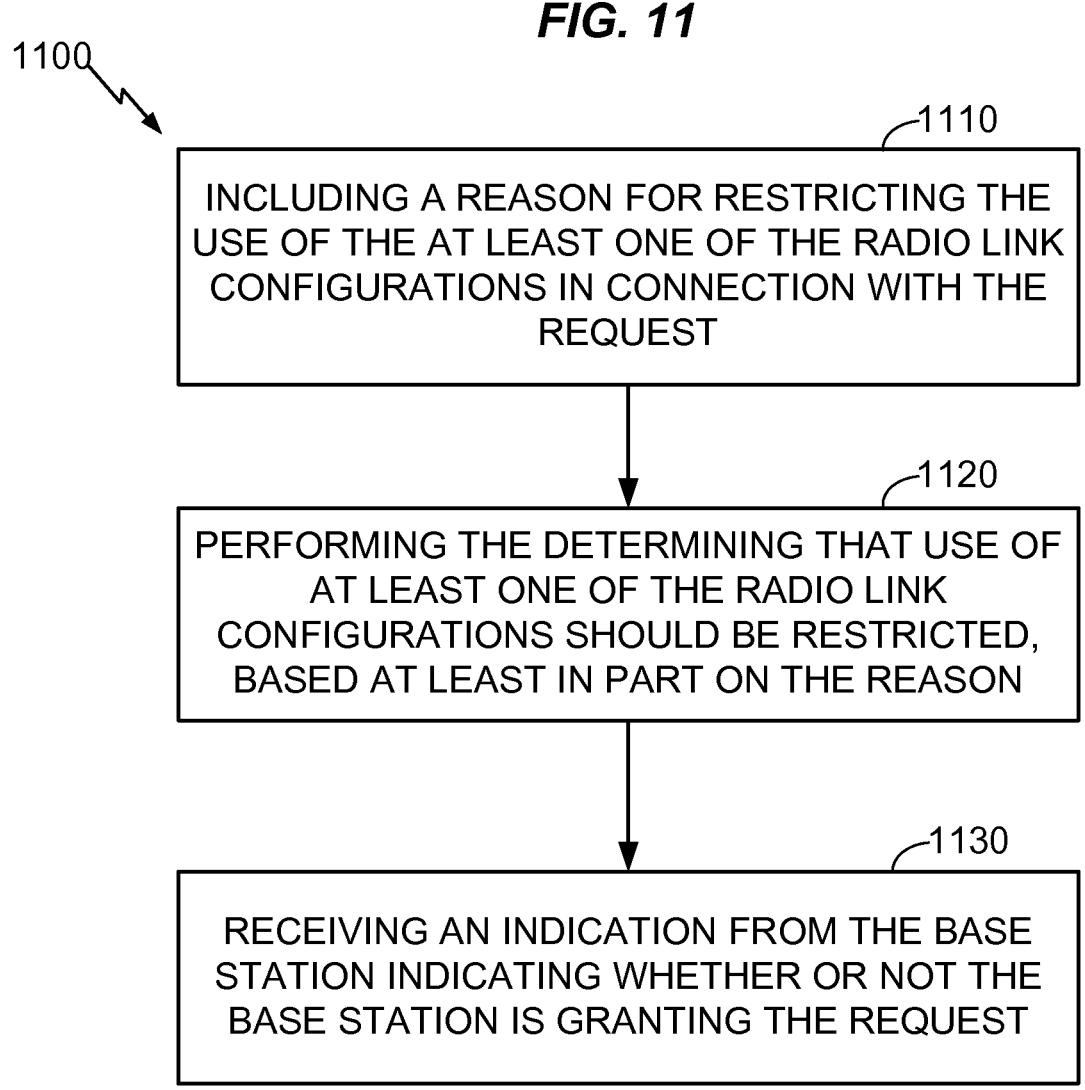
Figure 12:
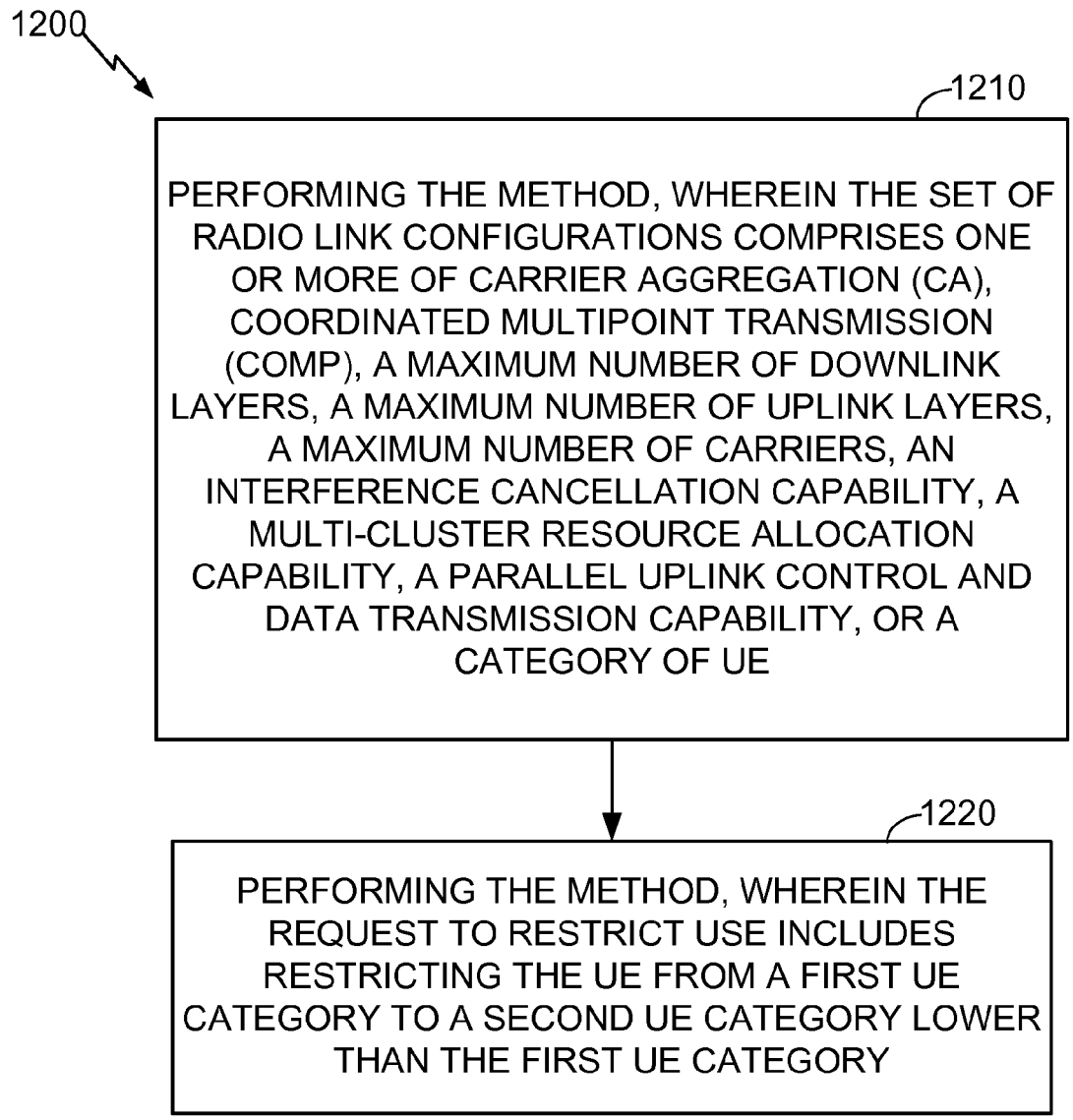

FIGS. 11-12 show further optional operations or aspects 1100 and 1200 that may be performed by the mobile entity in conjunction with the method 1000. The operations shown in FIGS. 11-12 are not required to perform the method 1000. Unless positioned directly on opposing branches off of an upstream block, operations are independently performed and not mutually exclusive. Therefore any one of such operations may be performed regardless of whether another downstream or upstream operation is performed. If the method 1000 includes at least one operation of FIGS. 11-12, then the method 1000 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Referring to FIG. 11, method 1000 may include one or more of the additional operations 1100. The method 1000 may further include, at 1110, the mobile entity including a reason for restricting the use of the at least one of the radio link configurations in connection with the request. The method 1000 may further include, at 1120, performing the determining that use of at least one of the radio link configurations should be restricted, based at least in part on the reason. The method 1000 may further include, at 1130, receiving an indication from the base station indicating whether or not the base station is granting the request. In the alternative, the mobile station may not receive any indication of whether or not the base station is granting the request.

Referring to FIG. 12, method 1000 may include one or more of the additional operations 1200. In an aspect of the method 1000, at 1210, the set of radio link configurations may include one or more of CA, CoMP, a maximum number of downlink layers, a maximum number of uplink layers, a maximum number of carriers, an interference cancellation capability, a multi-cluster resource allocation capability, a parallel uplink control and data transmission capability, or a category of UE. In another aspect of the method 1000, at 1200, the request to restrict use may include restricting the UE from a first UE category to a second UE category lower than the first UE category.

Figure 13:
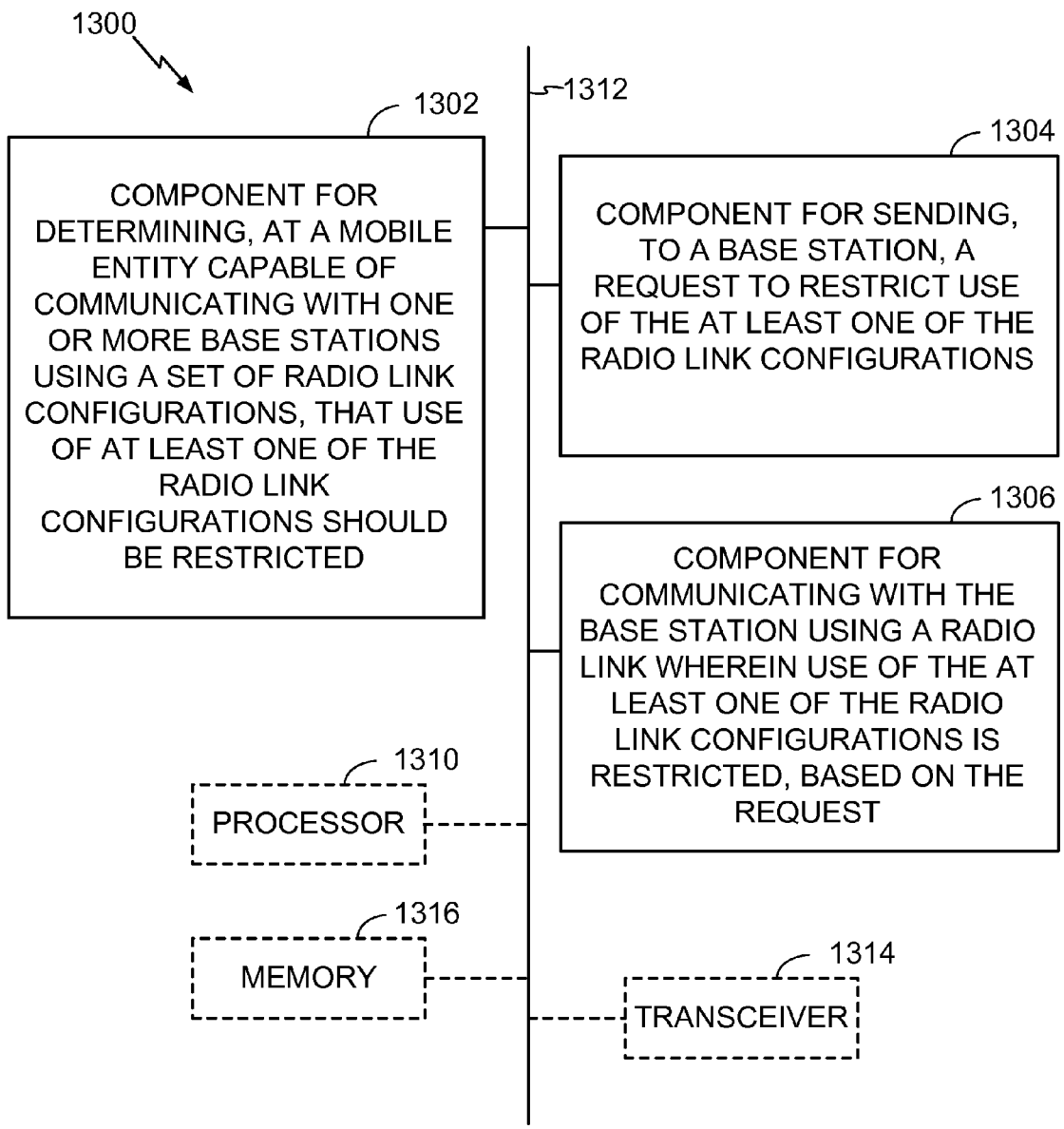
FIG. 13 is a block diagram illustrating an embodiment of a mobile apparatus for UE-assisted management of radio link features, in accordance with the methodologies of FIGS. 10-12.

With reference to FIG. 13, there is provided an exemplary apparatus 1300 that may be configured as a mobile entity or UE in a wireless network, or as a processor or similar device for use within the ME or UE, for UE-assisted management of radio link features at a mobile entity of a wireless communications system. The apparatus 1300 may include functional blocks that can represent functions implemented by a processor, software, or combination thereof (e.g., firmware).

In one embodiment, the apparatus 1300 may include an electrical component, means or module 1302 for determining, at a mobile entity capable of communicating with one or more base stations using a set of radio link configurations, that use of at least one of the radio link configurations should be restricted (e.g., at least partially disabled or not used). For example, the electrical component 1302 may include at least one control processor 1310 coupled to a transceiver 1314 or the like and to a memory 1316 with instructions for determining whether and/or when to restrict use of a radio link configuration. The control processor 1310 may operate an algorithm, which may be held as program instructions in the memory component 1316. The algorithm may include, for example, monitoring a status of power or processing resources, prospective demand for power or processing resources, or user input, and determining that a radio link should be restricted to conserve a resource.

The apparatus 1300 may include an electrical component 1304 for sending, to a base station, a request to restrict use of the at least one of the radio link configurations. For example, the electrical component 1304 may include at least one control processor 1310 coupled to a transceiver 1314 or the like and to a memory 1316 holding instructions for providing a request to restrict an identified advanced feature or radio link parameter. The control processor 1310 may operate an algorithm, which may be held as program instructions in the memory component 1316. The algorithm may include, for example, preparing an RRC signal or MAC information element including an indication of a request to restrict at least one radio link configuration selected from CA, CoMP, a maximum number of downlink layers, a maximum number of uplink layers, a maximum number of carriers, an interference cancellation capability, a multi-cluster resource allocation capability, a parallel uplink control and data transmission capability, or a category of UE, and transmitting the RRC signal or MAC information element to the base station.

The apparatus 1300 may include an electrical component 1306 for communicating with the base station using a radio link wherein use of the at least one of the radio link configurations is restricted, based on the request. For example, the electrical component 1306 may include at least one control processor 1310 coupled to a transceiver 1314 or the like and to a memory 1316 holding instructions for communicating over a radio link with a restricted feature. The control processor 1310 may operate an algorithm, which may be held as program instructions in the memory component 1316. The algorithm may include, for example, communicating with the base station with at least one temporary restriction of a radio link configuration selected from a restriction on CA, CoMP, a maximum number of downlink layers, a maximum number of uplink layers, a maximum number of carriers, an interference cancellation capability, a multi-cluster resource allocation capability, a parallel uplink control and data transmission capability, or a category of UE, until the restriction is lifted. The apparatus 1300 may include similar electrical components for performing any or all of the additional operations 1100 or 1200 described in connection with FIGS. 11-12, which for illustrative simplicity are not shown in FIG. 13.

In related aspects, the apparatus 1300 may optionally include a processor component 1310 having at least one processor, in the case of the apparatus 1300 configured as a mobile entity. The processor 1310, in such case, may be in operative communication with the components 1302-1306 or similar components via a bus 1312 or similar communication coupling. The processor 1310 may effect initiation and scheduling of the processes or functions performed by electrical components 1302-1306. The processor 1310 may encompass the components 1302-1306, in whole or in part. In the alternative, the processor 1310 may be separate from the components 1302-1306, which may include one or more separate processors.

In further related aspects, the apparatus 1300 may include a radio transceiver component 1314. A stand alone receiver and/or stand alone transmitter may be used in lieu of or in conjunction with the transceiver 1314. In the alternative, or in addition, the apparatus 1300 may include multiple transceivers or transmitter/receiver pairs, which may be used to transmit and receive on different carriers. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for performing the activity of the components 1302-1306, and subcomponents thereof, or the processor 1310, or the additional aspects 1100 or 1200, or the methods disclosed herein. The memory component 1316 may retain instructions for executing functions associated with the components 1302-1306. While shown as being external to the memory 1316, it is to be understood that the components 1302-1306 can exist within the memory 1316.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transitory tangible medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually hold data encoded magnetically, while discs hold data encoded optically. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
    determining, at a base station, that a mobile entity is capable of communicating with the base station via a radio access technology (RAT) using a set of radio link configurations for the RAT;
    receiving, from a mobile entity at the base station, a request to restrict use of at least one of the radio link configurations for the RAT;
    determining, at the base station, that the request can be granted based on at least one system parameter at the base station; and
    after determining that the request can be granted, serving the RAT to the mobile entity by restricting use of the at least one of the radio link configurations for communicating with the mobile entity, based on the request.

2. The method of claim 1, further comprising receiving a second request from the mobile entity requesting that the at least one of the radio link configurations be unrestricted, and thereafter using the at least one of the radio link configurations for communicating with the mobile entity, based on the second request.

3. The method of claim 1, wherein the request specifies a duration for restricting the use, and the restricting use is performed until the duration expires.

4. The method of claim 1, wherein the request indicates a reason for restricting the use of the at least one of the radio link configurations.

5. The method of claim 4, wherein determining that the request can be granted is based at least in part on the reason.

6. The method of claim 5, further comprising indicating an outcome of the determining that the request can be granted to the mobile entity.

7. The method of claim 1, wherein the set of radio link configurations comprises one or more of Carrier Aggregation (CA), Coordinated Multipoint Transmission (CoMP), a maximum number of downlink layers, a maximum number of uplink layers, a maximum number of carriers, a interference cancellation capability, a multi-cluster resource allocation capability, a parallel uplink control and data transmission capability, or a category of UE.

8. The method of claim 1, wherein the restriction is to restrict the mobile entity from a first user equipment (UE) category to a second UE category lower than the first UE category.

9. An apparatus for wireless communication, the apparatus comprising:
    means for determining that a mobile entity is capable of communicating with the apparatus via a radio access technology (RAT) using a set of radio link configurations;
    means for receiving, from the mobile entity, a request to restrict use of at least one of the radio link configurations for the RAT;
    means for determining that the request can be granted based on at least one system parameter for the apparatus; and
    means for serving the RAT to the mobile entity by restricting use of the at least one of the radio link configurations for communicating with the mobile entity after determining that the request can be granted, based on the request.

10. An apparatus for wireless communication, comprising:
    at least one processor configured to:
    determine that a mobile entity is capable of communicating with the apparatus via a radio access technology (RAT) using a set of radio link configurations,
    receive, from the mobile entity, a request to restrict use of at least one of the radio link configurations for the RAT,
    determine that the request can be granted based on at least one system parameter for the apparatus; and
    after determining that the request can be granted, serve the RAT to the mobile entity by restricting use of the at least one of the radio link configurations for communicating with the mobile entity, based on the request; and
    a memory coupled to the at least one processor for storing data.

11. The apparatus of claim 10, wherein the at least one processor is further configured to receive a second request from the mobile entity requesting that the at least one of the radio link configurations be unrestricted, and thereafter use the at least one of the radio link configurations for communicating with the mobile entity, based on the second request.

12. The apparatus of claim 10, wherein the at least one processor is further configured to receive the request specifying a duration for restricting the use, and restricting the use until the duration expires.

13. The apparatus of claim 10, wherein the at least one processor is further configured to receive the request indicating a reason for restricting the use of the at least one of the radio link configurations.

14. The apparatus of claim 13, wherein the at least one processor is further configured to determine that the request can be granted, based at least in part on the reason.

15. The apparatus of claim 14, wherein the at least one processor is further configured to indicate an outcome of the determining that the request can be granted to the mobile entity.

16. The apparatus of claim 10, wherein the at least one processor is further configured to determine that the mobile entity is capable of using the set of radio link configurations comprising one or more of: Carrier Aggregation (CA), Coordinated Multipoint Transmission (CoMP), a maximum number of downlink layers, a maximum number of uplink layers, a maximum number of carriers, a interference cancellation capability, a multi-cluster resource allocation capability, a parallel uplink control and data transmission capability, or a category of UE.

17. The apparatus of claim 10, wherein the at least one processor is further configured to perform the restriction including restricting the mobile entity from a first user equipment (UE) category to a second UE category lower than the first UE category.

18. A non-transitory computer-readable medium, comprising:
code for causing at least one computer associated with at least one base station to determine that a mobile entity is capable of communicating with a base station via a radio access technology (RAT) using a set of radio link configurations;
code for causing the at least one computer to receive, from the mobile entity, a request to restrict use of at least one of the radio link configurations for the RAT;
code for causing the at least one computer to determine that the request can be granted based on at least one system parameter at the base station; and
code for causing the at least one computer to serve the radio link to the mobile entity by restricting use of the at least one of the radio link configurations for communicating with the mobile entity after determining that the request can be granted, based on the request.

19. A method for wireless communication, the method comprising:
determining, at a mobile entity capable of communicating with at least one base station via a radio access technology (RAT) using a set of radio link configurations, that use of at least one of the radio link configurations should be restricted;
sending, to a base station, a request to restrict use of the at least one of the radio link configurations for the RAT;
receiving, at the mobile entity from the base station, an indication from the base station indicating whether or not the base station is granting the request; and
communicating with the base station using the RAT, wherein use of the at least one of the radio link configurations for the RAT is restricted, based on the request, responsive to the indication indicating that the base station is granting the request.

20. The method of claim 19, further comprising sending a second request to the base station requesting that the at least one of the radio link configurations be unrestricted, and thereafter using the at least one of the radio link configurations for communicating with the base station, based on the second request.

21. The method of claim 19, further comprising specifying a duration for restricting the use in connection with the request, and performing the communicating with the base station using a radio link wherein use of the at least one of the radio link configurations is restricted until the duration expires.

22. The method of claim 19, further comprising including a reason for restricting the use of the at least one of the radio link configurations, in connection with the request.

23. The method of claim 19, wherein the set of radio link configurations comprises one or more of: Carrier Aggregation (CA), Coordinated Multipoint Transmission (CoMP), a maximum number of downlink layers, a maximum number of uplink layers, a maximum number of carriers, an interference cancellation capability, a multi-cluster resource allocation capability, a parallel uplink control and data transmission capability, or a category of UE.

24. The method of claim 19, wherein the request to restrict use includes restricting the mobile entity from a first user equipment (UE) category to a second UE category lower than the first UE category.

25. An apparatus for wireless communication, the apparatus comprising:
means for determining, at a mobile entity capable of communicating with at least one base station via a radio access technology using a set of radio link configurations, that use of at least one of the radio link configurations should be restricted;
means for sending, to a base station, a request to restrict use of the at least one of the radio link configurations for the RAT;
means for receiving an indication from the base station indicating whether or not the base station is granting the request; and
means for communicating with the base station using the RAT, wherein use of the at least one of the radio link configurations for the RAT is restricted, based on the request, responsive to the indication indicating that the base station is granting the request.

26. An apparatus for wireless communication, comprising:
at least one processor configured to:
determine, at a mobile entity capable of communicating with at least one base station via a radio access technology (RAT) using a set of radio link configurations, that use of at least one of the radio link configurations should be restricted,
send, to a base station, a request to restrict use of the at least one of the radio link configurations for the RAT,
receive an indication from the base station indicating whether or not the base station is granting the request; and
communicate with the base station using the RAT, wherein use of the at least one of the radio link configurations is restricted, based on the request, responsive to the indication indicating that the base station is granting the request; and
a memory coupled to the at least one processor for storing data.

27. The apparatus of claim 26, wherein the processor is further configured to send a second request to the base station requesting that the at least one of the radio link configurations be unrestricted, and thereafter use the at least one of the radio link configurations for communicating with the base station, based on the second request.

28. The apparatus of claim 26, wherein the processor is further configured to specify a duration for restricting the use in connection with the request, and communicate with the base station using a radio link wherein use of the at least one of the radio link configurations is restricted until the duration expires.

29. The apparatus of claim 26, wherein the processor is further configured to include a reason for restricting the use of the at least one of the radio link configurations, in connection with the request.

30. The apparatus of claim 26, wherein the processor is further configured to use at least one of the set of radio link configurations comprises one or more of: Carrier Aggregation (CA), Coordinated Multipoint Transmission (COMP), a maximum number of downlink layers, a maximum number of uplink layers, a maximum number of carriers, an interference cancellation capability, a multi-cluster resource allocation capability, a parallel uplink control and data transmission capability, or a category of UE.

31. The apparatus of claim 26, wherein the processor is further configured to send the request to restrict use including restricting the mobile entity from a first user equipment (UE) category to a second UE category lower than the first UE category.

32. A non-transitory computer-readable medium, comprising:
   code for causing at least one computer to determine, at a mobile entity capable of communicating with at least one base station via a radio access technology (RAT) using a set of radio link configurations, that use of at least one of the radio link configurations should be restricted;
   code for causing the at least one computer to send, to a base station, a request to restrict use of the at least one of the radio link configurations for the RAT;
   code for causing the at least one computer to receive an indication from the base station indicating whether or not the base station is granting the request; and
   code for causing the at least one computer to communicate with the base station using the RAT, wherein use of the at least one of the radio link configurations is restricted, based on the request, responsive to the indication indicating that the base station is granting the request.

* * * * *